(12) United States Patent
Kasahara

(10) Patent No.: US 9,247,188 B2
(45) Date of Patent: Jan. 26, 2016

(54) IMAGE CAPTURING APPARATUS, IMAGE CAPTURING SYSTEM, AND IMAGE CAPTURING METHOD THAT PERFORMS INVERSE TRANSFORM PROCESSING ON AN IMAGE USING AN INVERSE TRANSFORM FILTER

(71) Applicant: Ryosuke Kasahara, Kanagawa (JP)

(72) Inventor: Ryosuke Kasahara, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/290,086

(22) Filed: May 29, 2014

(65) Prior Publication Data
US 2014/0375847 A1     Dec. 25, 2014

(30) Foreign Application Priority Data

Jun. 21, 2013    (JP) ................................ 2013-131182

(51) Int. Cl.
*H04N 5/72*     (2006.01)
*G06T 5/00*     (2006.01)
*H04N 5/217*     (2011.01)
*H04N 5/357*     (2011.01)

(52) U.S. Cl.
CPC ........ *H04N 5/72* (2013.01); *G06T 5/003* (2013.01); *H04N 5/217* (2013.01); *H04N 5/357* (2013.01); *H04N 5/3572* (2013.01)

(58) Field of Classification Search
CPC ...... H04N 5/23212; G02B 7/36; G02B 7/365; G02B 7/38; G06T 5/003; G06T 5/004; G06T 2207/20201
USPC .................................................. 348/345–356
See application file for complete search history.

(56) References Cited

U.S. PATENT DOCUMENTS

| 5,511,155 | A  | * | 4/1996  | Yamaguchi ................. 345/643 |
| 6,154,574 | A  |   | 11/2000 | Paik et al. |
| 2011/0285879 | A1 | * | 11/2011 | Hatakeyama ............... 348/241 |
| 2012/0236171 | A1 |   | 9/2012  | Asakura et al. |
| 2012/0300114 | A1 | * | 11/2012 | Isogai et al. ................. 348/345 |
| 2013/0010158 | A1 |   | 1/2013  | Watanabe |
| 2013/0010160 | A1 | * | 1/2013  | Kawamura ............... 348/231.99 |

FOREIGN PATENT DOCUMENTS

| JP | 2011-151448 | 8/2011 |
| WO | WO 2004/063989 A2 | 7/2004 |

OTHER PUBLICATIONS

The Extended European Search Report issued Nov. 7, 2014, in Application No. / Patent No. 14171519.3-1902.

* cited by examiner

*Primary Examiner* — Nelson D. Hernández Hernández
(74) *Attorney, Agent, or Firm* — Oblon, McClelland, Maier & Neustadt, L.L.P

(57) ABSTRACT

An image capturing apparatus includes: an optical system that provides an aberration to incident light; an image capturing unit that transforms the light passing through the optical system into pixels to capture an image; and an inverse transform unit that performs inverse transform processing on the image captured by the image capturing unit in a predetermined range on an optical axis of the optical system using an inverse transform filter that causes frequency characteristics of pixels in an output image in two or more of defocus positions within the predetermined range to include at least one frequency characteristic with a larger value and at least one frequency characteristic with a smaller value with respect to frequency characteristic of pixels in an ideal image of a subject.

14 Claims, 10 Drawing Sheets

FIG.9

INVERSE
TRANSFORM FILTER
⌐121

| a11 | a12 | a13 | a14 | a15 |
|-----|-----|-----|-----|-----|
| a21 | a22 | a23 | a24 | a25 |
| a31 | a32 | a33 | a34 | a35 |
| a41 | a42 | a42 | a43 | a45 |
| a51 | a52 | a53 | a54 | a55 |

FIG.10

TARGET PARTIAL IMAGE
OF NORMAL IMAGE
131

| A11 | A12 | A13 | A14 | A15 |
|---|---|---|---|---|
| A21 | A22 | A23 | A24 | A25 |
| A31 | A32 | A33 | A34 | A35 |
| A41 | A42 | A43 | A44 | A45 |
| A51 | A52 | A53 | A54 | A55 |

* (CONVO-
LUTION)

INVERSE TRANSFORM FILTER
121

| a11 | a12 | a13 | a14 | a15 |
|---|---|---|---|---|
| a21 | a22 | a23 | a24 | a25 |
| a31 | a32 | a33 | a34 | a35 |
| a41 | a42 | a43 | a44 | a45 |
| a51 | a52 | a53 | a54 | a55 |

$$= \begin{array}{l} A11 \times a11 + A12 \times a12 + A13 \times a13 + A14 \times a14 + A15 \times a15 \\ + A21 \times a21 + A22 \times a22 + A23 \times a23 + A24 \times a24 + A25 \times a25 \\ + A31 \times a31 + A32 \times a32 + A33 \times a33 + A34 \times a34 + A35 \times a35 \\ + A41 \times a41 + A42 \times a42 + A43 \times a43 + A44 \times a44 + A45 \times a45 \\ + A51 \times a51 + A52 \times a52 + A53 \times a53 + A54 \times a54 + A55 \times a55 \end{array} \quad \cdots \text{EQUATION (1)}$$

IMAGE CAPTURING APPARATUS, IMAGE CAPTURING SYSTEM, AND IMAGE CAPTURING METHOD THAT PERFORMS INVERSE TRANSFORM PROCESSING ON AN IMAGE USING AN INVERSE TRANSFORM FILTER

CROSS-REFERENCE TO RELATED APPLICATIONS

The present application claims priority to and incorporates by reference the entire contents of Japanese Patent Application No. 2013-131182 filed in Japan on Jun. 21, 2013.

BACKGROUND OF THE INVENTION

1. Field of the Invention

The present invention relates to an image capturing apparatus, an image capturing system, and an image capturing method.

2. Description of the Related Art

In recent years, with the development of information digitization, the digitization in the field of image capturing apparatuses is also significantly developed. Particularly, in the image capturing apparatus such as a digital camera, a solid-state image capturing element is used instead of a conventional film for image capture. As the solid-state image capturing element (hereinafter, "image capturing element"), a charge coupled device (CCD) sensor or a complementary metal oxide semiconductor (CMOS) sensor or the like is used.

The image capturing apparatus using the image capturing element like this captures light reflected from a subject through an optical system, converts the light into an electric signal with the image capturing element, and extracts the electric signal. Exemplified as the image capturing apparatus are video cameras, barcode readers, mobile phones, personal digital assistants (PDA), and industrial cameras, in addition to digital cameras.

As the image capturing apparatus, there is so-called an extended depth of field (EDoF) camera for extending the depth of field by an optical system. The depth of field refers to the range of distance, over which the subject is acceptably in focus in an optical axis direction of the lens, with respect to a subject at a distance from the lens of a camera.

The extension of the depth of field by the optical system will be specifically explained. A lens and a phase plate included in the optical system serve to provide an aberration to the light of the subject incident to the image capturing element and to add a point spread function (PSF) to the light. For example, the lens provides spherical aberration as the aberration to the light of the subject incident to the image capturing element. The optical system blurs an image captured by the image capturing element but makes the blur uniform in a wide range of depth of field by the aberration. Therefore, the image blurred by the optical system needs to be corrected so as to obtain a value of predetermined modulation transfer function (MTF). The MTF indicates a value evaluates how faithfully contrasts in the subject can be reproduced, i.e., indicates contrast reproducibility. As the image capturing apparatus that corrects the blur to the image blurred by the optical system, Japanese Laid-open Patent Publication No. 2011-151448 has proposed a device that improves the MTF and corrects the image to a high resolution image by applying inverse transform processing of the PSF to the image. The inverse transform processing is implemented by correcting the blur of the image by applying filter processing, using an inverse transform filter, to information of pixels (information (value) itself output from a pixel is hereinafter called "pixel") forming an image blurred by the optical system.

However, the image capturing apparatus described in Japanese Laid-open Patent Publication No. 2011-151448 optically provides the aberration to extend the depth of field and corrects the blur of the image using the inverse transform filter, but the inverse transform filter is derived based on the MTF in one focus position. Therefore, there remains a problem that normal correction is not possible in a position that is different in a shape of a spot from the focus position where the inverse transform filter is derived, among spots optically enlarged in the depth of field. In other words, there remains a problem that a range where the inverse transform filter enables normal correction falls within a range in which the shapes of the spots does not change and that the depth of field can be extended only up to the range.

In view of the above, there is a need to provide an image capturing apparatus, an image capturing system, and an image capturing method capable of extending the depth of field up to a wider range.

SUMMARY OF THE INVENTION

It is an object of the present invention to at least partially solve the problems in the conventional technology.

An image capturing apparatus includes: an optical system that provides an aberration to incident light; an image capturing unit that transforms the light passing through the optical system into pixels to capture an image; and an inverse transform unit that performs inverse transform processing on the image captured by the image capturing unit in a predetermined range on an optical axis of the optical system using an inverse transform filter that causes frequency characteristics of pixels in an output image in two or more of defocus positions within the predetermined range to include at least one frequency characteristic with a larger value and at least one frequency characteristic with a smaller value with respect to frequency characteristic of pixels in an ideal image of a subject.

An image capturing system includes: an image capturing apparatus as described above; and an information processing device that includes a communication unit that receives the image subjected to the inverse transform processing from the image capturing apparatus, and a display unit that displays the image.

An image capturing method includes: providing an aberration to incident light; transforming the light provided with the aberration into pixels to capture an image; and performing inverse transform processing on the image captured in a predetermined range on an optical axis of the optical system using an inverse transform filter that causes frequency characteristics of pixels in an output image in two or more of defocus positions within the predetermined range to include at least one frequency characteristic with a larger value and at least one frequency characteristic with a smaller value with respect to frequency characteristic of pixels in an ideal image of a subject.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a diagram of a configuration example of an inverse transform filter;

FIG. 10 is a diagram for explaining how the inverse transform filter performs filter processing on the image;

DETAILED DESCRIPTION OF THE PREFERRED EMBODIMENTS

Figure 1:
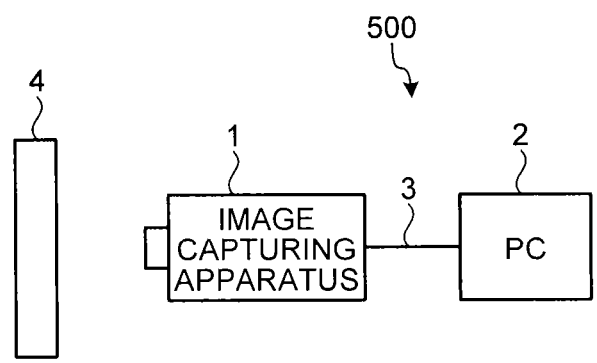
FIG. 1 is a diagram of an example of an overall configuration of an image capturing system according to an embodiment.

Exemplary embodiments of the image capturing apparatus, the image capturing system, and the image capturing method according to the present invention will be explained in detail below with reference to the accompanying drawings. The present invention is not limited by the following embodiments. In addition, the components in the embodiments described as follows include those which can be easily thought of by persons skilled in the art, those which are substantially equivalents, and those in a scope of so-called equivalents. Moreover, the components can be omitted, replaced, and modified in various ways within a scope that does not depart from the gist of the following embodiments.
Overall Configuration of Image Capturing System FIG. 1 is a diagram of an example of an overall configuration of an image capturing system according to an embodiment. The configuration of an image capturing system 500 according to the present embodiment will be explained below with reference to FIG. 1.

As illustrated in FIG. 1, the image capturing system 500 according to the present embodiment includes an image capturing apparatus 1 and a PC 2. The image capturing apparatus 1 and the PC 2 are communicably connected to each other by a communication cable 3 such as an Ethernet cable.

The image capturing apparatus 1 captures an image of a subject 4 by converting the light output from the subject 4 into an electric signal, obtains information for the image (hereinafter, "image"), and transmits the image to the PC 2 via the communication cable 3. The PC 2 executes predetermined processing to the image received from the image capturing apparatus 1.

For example, the image capturing apparatus 1 captures an image of a barcode attached to a product flowing through a production line, and transmits the image of the barcode to the PC 2. The PC 2 reads information of the barcode from the received image and analyzes the information.

As illustrated in FIG. 1, the image capturing system 500 adopts a cable communication system in which the image capturing apparatus 1 and the PC 2 perform data communication via the communication cable 3; however, it is not limited thereto. For example, the image capturing apparatus 1 and the PC 2 can perform data communication using a wireless communication system such as Wireless Fidelity (Wi-Fi).

Figure 2:
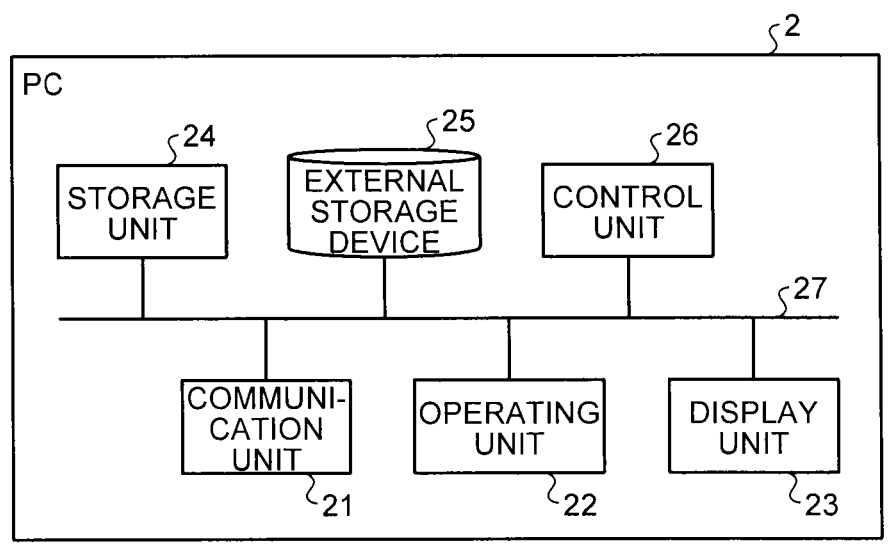
FIG. 2 is a diagram of a configuration example of an information processing device according to the embodiment.

When the image capturing apparatus 1 and the PC 2 are used in the production line, the image capturing system 500 may be configured so that the PC 2 is communicably connected to a programmable logic controller (PLC) or the like. In this case, as an operation of the image capturing system 500, following operations are exemplified as an example. The image capturing apparatus 1 captures an image of a barcode attached to a product flowing through the production line and transmits the image of the barcode to the PC 2. The PC 2 determines a product number of the product flowing through the production line from the received image of the barcode. When the determined product number does not coincide with a product number of a changed-over product in the production line, the PC 2 transmits a signal indicating that the product corresponding to the determined product number is a product with an improper product number to the PLC. When receiving the signal indicating the product with the improper product number from the PC 2, the PLC controls the operation of the production line so as to remove the product from the production line.
Configuration of Information Processing Device FIG. 2 is a diagram of a configuration example of an information processing device according to the embodiment. The configuration of the PC 2 being an example of the information processing device will be explained below with reference to FIG. 2.

As illustrated in FIG. 2, the PC 2 being an example of the information processing device includes a communication unit 21, an operating unit 22, a display unit 23, a storage unit 24, an external storage device 25, and a control unit 26. The units are connected to each other through a bus 27, which enables data transmission and reception.

The communication unit 21 is a device that communicates with the image capturing apparatus 1 via the communication cable 3. The communication unit 21 is implemented by a communication device such as network interface card (NIC). A communication protocol of the communication unit 21 is implemented by Transmission Control Protocol (TCP)/Internet Protocol (IP) or User Datagram Protocol (UDP)/IP, or the like.

The operating unit 22 is a device to which an operation is input in order that the user causes the control unit 26 to execute predetermined processing. The operating unit 22 is implemented by, for example, a mouse, a keyboard, a numeric keypad, and an operation input function in a touch pad or in a touch panel.

The display unit 23 is a device that displays an image of an application executed by the control unit 26, and the like. The display unit 23 is implemented by, for example, a cathode ray tube (CRT) display, a liquid crystal display, a plasma display, or an organic electro-luminescence (OEL) display.

The storage unit 24 is a device that stores data and/or the like used for various programs executed by the PC 2 and various processings performed by the PC 2. The storage unit 24 is implemented by a storage device such as a read-only memory (ROM) and a random access memory (RAM).

The external storage device 25 is a storage device that accumulates and stores images, programs, font data, and/or the like. The external storage device 25 is implemented by a storage device such as a hard disk drive (HDD), a solid state drive (SSD), an optical disc, or a magneto-optical disc (MO).

The control unit 26 is a device that controls operations of the units in the PC 2. The control unit 26 is implemented by, for example, a central processing unit (CPU) and/or an application-specific integrated circuit (ASIC).

Configuration of Image Capturing Apparatus

Figure 3:
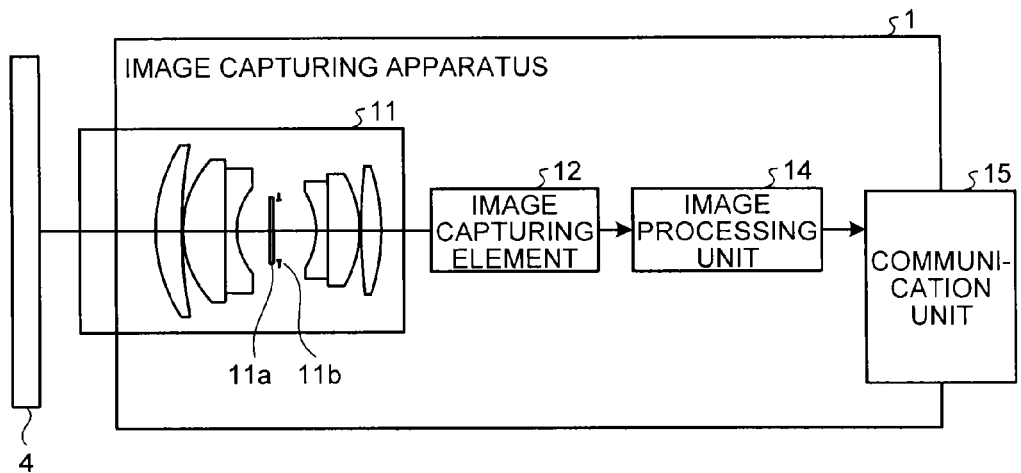
FIG. 3 is a diagram of a configuration example of an image capturing apparatus according to the embodiment.

FIG. 3 is a diagram of a configuration example of the image capturing apparatus according to the embodiment. The configuration of the image capturing apparatus 1 according to the present embodiment will be explained below with reference to FIG. 3.

As illustrated in FIG. 3, the image capturing apparatus 1 includes a lens unit 11 (optical system), an image capturing element 12 (image capturing unit), an image processing unit 14, and a communication unit 15.

The lens unit 11 is a unit that condenses light output from the subject 4 and forms an image on the image capturing element 12. The lens unit 11 is implemented by an optical system formed with one or more lenses. The lens unit 11 includes a phase plate 11a and a diaphragm 11b. The subject 4 is, for example, a person, an object to be monitored, a barcode, a two-dimensional code, or a character string.

The phase plate 11a has an effect of providing an aberration d to the light incident to the lens unit 11. As a result, the phase plate 11a serves to add the PSF to the light incident to the image capturing element 12 and thus blurs the image captured by the image capturing element 12 but makes the blur uniform in a wide range of depth of field.

The diaphragm 11b is a member for freely adjusting the amount of light incident to the lens unit 11, and is disposed near the phase plate 11a.

The image capturing element 12 is a solid-state image capturing element that captures an image of the subject 4 by converting the light that is output from the subject 4 and is incident to the lens unit 11 into an electric signal and generates the image. The image capturing element 12 outputs pixels forming the image captured by the pixels forming the solid-state image capturing element. The image capturing element 12 is implemented by a charge-coupled device (CCD) sensor, a complementary metal oxide semiconductor (CMOS) sensor, or the like.

The image processing unit 14 is a device that generates an image subjected to the filter processing from the image output from the image capturing element 12.

The communication unit 15 is a device that communicates with the PC 2 via the communication cable 3. The communication unit 15 transmits, for example, the image output from the image processing unit 14 to the PC 2. The communication unit 15 is implemented by a communication device such as the NIC. A communication protocol of the communication unit 15 is implemented by TCP/IP or UDP/IP or the like.

Configuration and Operation of Image Processing Unit

Figure 4:
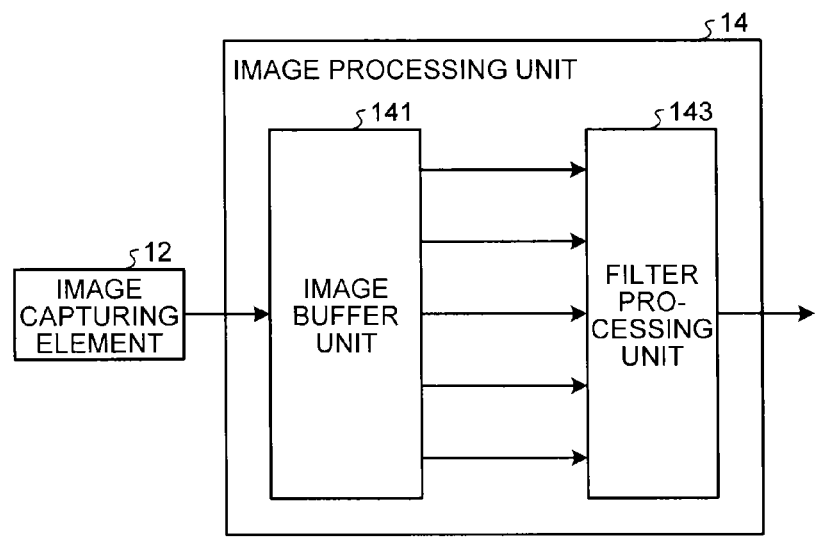
FIG. 4 is a diagram of a configuration example of an image processing unit in the image capturing apparatus according to the embodiment.
Figure 5:
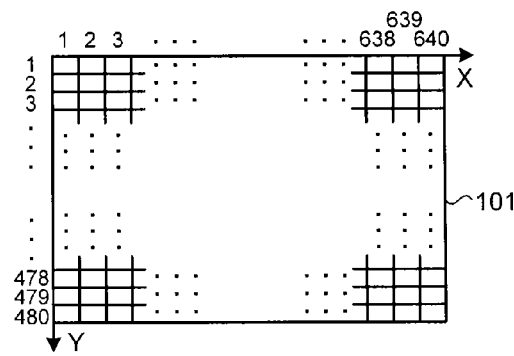
FIG. 5 is a diagram of an example of an image detected by an image capturing element in the image capturing apparatus according to the embodiment.

FIG. 4 is a diagram of a configuration example of the image processing unit in the image capturing apparatus according to the embodiment. FIG. 5 is a diagram of an example of an image detected by the image capturing element in the image capturing apparatus according to the embodiment. The configuration of the image processing unit 14 in the image capturing apparatus 1 according to the present invention will be explained below with reference to FIG. 4.

The image capturing element 12 is, as explained above, the solid-state image capturing element that captures an image of the subject 4 by converting the light output from the subject incident to the lens unit 11 into an electric signal and generates the image. The image capturing element 12 will be explained below as the one that forms and outputs an image with a video graphics array (VGA). Specifically, as illustrated in FIG. 5, the image capturing element 12 detects a detection image 101 being an image formed with pixels arrayed in a 640×480 matrix, using detecting elements having 640 in an X direction and 480 in a Y direction.

The size of the image detected by the image capturing element 12 is assumed to be that of an image at a VGA resolution of 640×480; however, it is not limited thereto. Therefore, the image may have a different size therefrom.

As illustrated in FIG. 4, the image processing unit 14 according to the present embodiment includes an image buffer unit 141 and a filter processing unit 143 (inverse transform unit).

The image buffer unit 141 is a device that sequentially receives pixels output from the image capturing element 12 and performs buffering. A specific configuration and operation of the image buffer unit 141 will be explained later with reference to FIG. 6 and FIG. 7.

The filter processing unit 143 performs predetermined filter processing by a filter circuit on the pixels output from the image buffer unit 141. In the present embodiment, an inverse transform filter to perform inverse transform processing for correcting blur on the blurred image applied with the PSF by the action of the phase plate 11a will be explained as an example of a filter used for the filter processing. A specific configuration and operation of the filter processing unit 143 will be explained later with reference to FIG. 8 to FIG. 11.

Configuration and Operation of Image Buffer Unit 141

Figure 6:
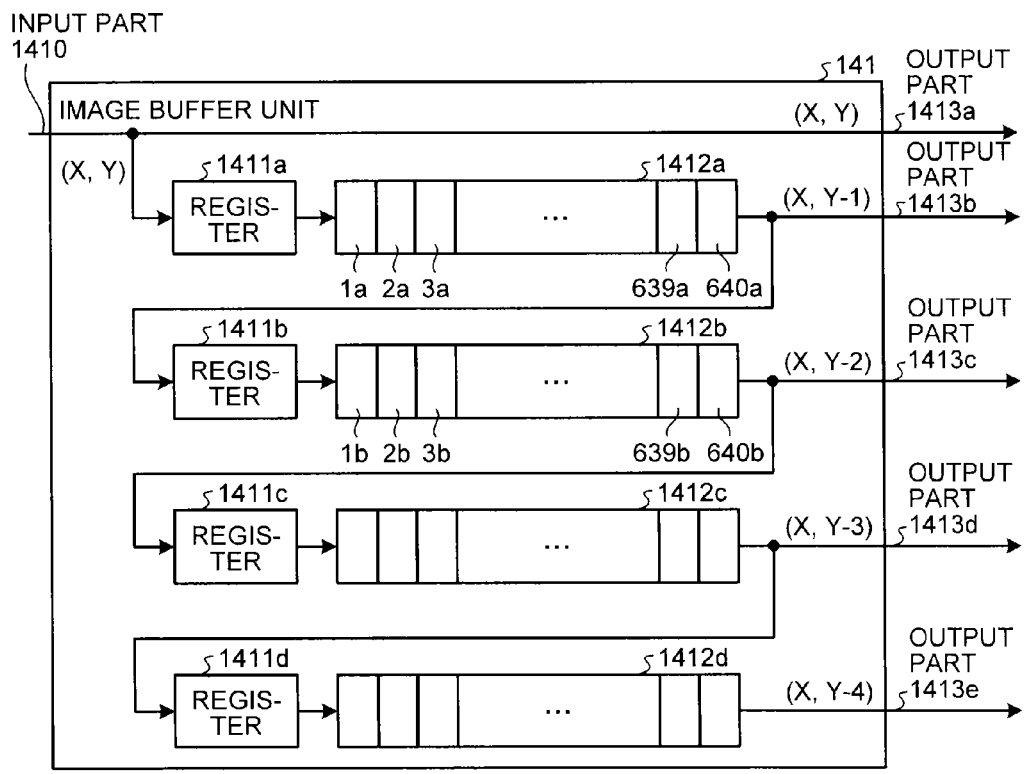
FIG. 6 is a diagram of a configuration example of an image buffer unit in the image processing unit according to the embodiment.
Figure 7:
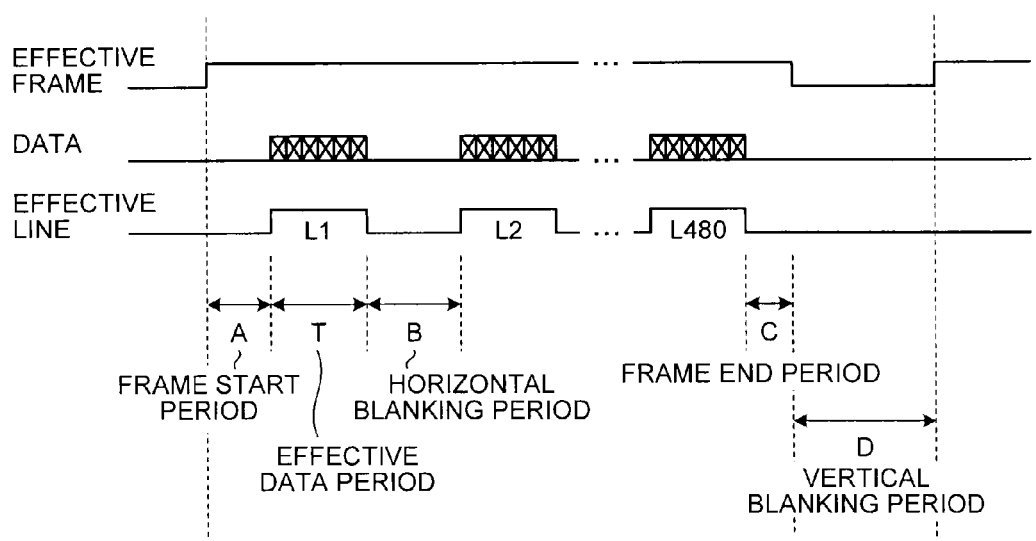
FIG. 7 is a timing chart illustrating an operation of inputting pixels output from the image capturing element into the image buffer unit.

FIG. 6 is a diagram of a configuration example of the image buffer unit in the image processing unit according to the embodiment. FIG. 7 is a timing chart illustrating an operation of inputting pixels output from the image capturing element into the image buffer unit. The configuration and operation of the image buffer unit 141 of the image processing unit 14 are explained with reference to FIG. 6 and FIG. 7.

The image buffer unit 141 includes, as illustrated in FIG. 6, registers 1411a to 1411d and line buffers 1412a to 1412d. The image buffer unit 141 receives the pixels output from the image capturing element 12 through an input part 1410, and outputs the buffered pixels from output parts 1413a to 1413e. For 640×480 pixels of the image detected by the image capturing element 12, a pixel as an X-th in the X direction and as a Y-th in the Y direction is represented as a pixel (X, Y).

As illustrated in FIG. 6, the input side of the register 1411a is connected to the input part 1410 and to the output part 1413a. The output sides of the registers 1411a to 1411d are connected to the input sides of the line buffers 1412a to 1412d, respectively. The output sides of the line buffers 1412a to 1412c are connected to the input sides of the registers 1411b to 1411d, respectively. The output sides of the line buffers 1412a to 1412d are connected to the output parts 1413b to 1413e, respectively.

An output operation of the image detected by the image capturing element 12 will be explained next with reference to FIG. 7. The image capturing element 12 outputs pixels included in one horizontal line while scanning the detected pixels in each horizontal line in the X direction. Specifically, the image capturing element 12 outputs the pixels included in a first horizontal line in the Y direction in order from a 1st pixel to a 640-th pixel in the X direction. The image capturing element 12 outputs the pixels included in horizontal lines up to a 480-th horizontal line in the Y direction while performing the operation above.

The operation will be explained below based on the timing chart illustrated in FIG. 7. As illustrated in FIG. 7, the image capturing element 12 outputs pixels for one frame i.e. for one image when an effective frame signal is in an on-state. In the image capturing element 12, an effective line signal L1 indicating that the pixels in the first horizontal line in the Y direction are allowed to be output becomes an on-state after a frame start period A since the effective frame signal becomes the on-state. The image capturing element 12 scans the first horizontal line in the Y direction during an effective data period T in which the effective line signal L1 is in the on-state, and sequentially outputs the 1st to the 640-th pixels (pixels (1, 1) to (640, 1)) in the X direction included in the first horizontal line. After the image capturing element 12 outputs the pixels in the first horizontal line in the Y direction, the effective line signal L1 becomes an off-state.

In the image capturing element 12, an effective line signal L2 indicating that the pixels in a second horizontal line in the Y direction are allowed to be output becomes the on-state after a horizontal blanking period B since the effective line signal L1 becomes the off-state. The image capturing element 12 scans the second horizontal line in the Y direction during the effective data period T in which the effective line signal L2 is in the on-state, and sequentially outputs the 1st to the 640-th pixels (pixels (1, 2) to (640, 2)) in the X direction included in the second horizontal line. After the image capturing element 12 outputs the pixels in the second horizontal line in the Y direction, the effective line signal L2 becomes the off-state.

The image capturing element 12 performs the operations until the 1st to the 640-th pixels in the X direction included in a 480-th horizontal line in the Y direction are output during the effective data period T in which an effective line signal L480 is in the on-state. In the image capturing element 12, the effective frame signal becomes the off-state after a frame end period C since the effective line signal L480 becomes the off-state. The image capturing element 12 performs the operations to end the output of the pixels for the one frame. In the image capturing element 12, the effective frame signal again becomes the on-state after a vertical blanking period D since the effective frame signal becomes the off-state, and the output of pixels for next one frame is started.

The buffering processing of pixels output from the image capturing element 12 in the image buffer unit 141 will be explained next with reference to FIG. 6. The image buffer unit 141 receives pixels output from the image capturing element 12 from the input part 1410. Specifically, first of all, for the first horizontal line in the Y direction, the image buffer unit 141 outputs the pixel (1, 1) received from the image capturing element 12 from the output part 1413a and stores the pixel in the register 1411a.

The image buffer unit 141 stores the pixel stored in the register 1411a in a storage area 1a of the line buffer 1412a at a next timing. The image buffer unit 141 then outputs a pixel (2, 1) subsequently received from the image capturing element 12 from the output part 1413a and stores the pixel in the register 1411a.

The image buffer unit 141 shifts the pixel stored in the storage area 1a to a storage area 2a of the line buffer 1412a and stores the pixel therein at a next timing, and stores the pixel stored in the register 1411a in the storage area 1a. The image buffer unit 141 then outputs a pixel (3, 1) subsequently received from the image capturing element 12 from the output part 1413a and stores the pixel in the register 1411a.

By repeating the above operations, the image buffer unit 141 outputs the pixels in the first horizontal line in the Y direction received from the image capturing element 12 from the output part 1413a. Along with this, the image buffer unit 141 stores the 1st to 639-th pixels in the first horizontal line in the Y direction in storage areas 639a to 1a of the line buffer 1412a respectively, and stores the 640-th pixel in the register 1411a. Subsequently, the image buffer unit 141 shifts the pixels stored in the storage areas 1a to 639a of the line buffer 1412a to the storage areas 2a to 640a and stores the pixels therein, and stores the pixel stored in the register 1411a in the storage area 1a. The image buffer unit 141 outputs the pixel (1, 1) stored in the storage area 640a from the output part 1413b and stores the pixel in the register 1411b. For the second horizontal line in the Y direction, the image buffer unit 141 outputs a pixel (1, 2) received from the image capturing element 12 from the output part 1413a and stores the pixel in the register 1411a. That is, the image buffer unit 141 outputs the pixels (1, 1) and (1, 2) that are the same in the value in the X direction from the output parts 1413b and 1413a, respectively.

The image buffer unit 141 stores the pixel stored in the register 1411b in a storage area 1b of the line buffer 1412b at the next timing. The image buffer unit 141 shifts the pixels stored in the storage areas 1a to 639a of the line buffer 1412a to the storage areas 2a to 640a and stores the pixels therein, and stores the pixel stored in the register 1411a in the storage area 1a. The image buffer unit 141 outputs the pixel (2, 1) stored in the storage area 640a from the output part 1413b and stores the pixel in the register 1411b. The image buffer unit 141 then outputs a pixel (2, 2) subsequently received from the image capturing element 12 from the output part 1413a and stores the pixel in the register 1411a.

The image buffer unit 141 shifts the pixel stored in the storage area 1b to a storage area 2b of the line buffer 1412b and stores the pixel therein at the next timing, and stores the pixel stored in the register 1411b in the storage area 1b. The image buffer unit 141 shifts the pixels stored in the storage areas 1a to 639a of the line buffer 1412a to the storage areas 2a to 640a and stores the pixels therein, and stores the pixel stored in the register 1411a in the storage area 1a. The image buffer unit 141 outputs the pixel (3, 1) stored in the storage area 640a from the output part 1413b and stores the pixel in the register 1411b. The image buffer unit 141 outputs a pixel (3, 2) subsequently received from the image capturing element 12 from the output part 1413a and stores the pixel in the register 1411a.

By repeating the above operations, the image buffer unit 141 outputs pixels that are the same in the value in the X direction among the pixels in the first and the second horizontal lines in the Y direction received from the image capturing element 12, from the output parts 1413a and 1413b, respectively, at the same timing. Along with this, the image buffer unit 141 stores the 1st to 639-th pixels in the first horizontal line in the Y direction in storage areas 1b to 639b of the line buffer 1412b respectively, and stores the 640-th pixel in the register 1411b. Moreover, the image buffer unit 141 stores the 1st to 639-th pixels in the second horizontal line in the Y direction in the storage areas 1a to 639a of the line buffer 1412a respectively, and stores the 640-th pixel in the register 1411a.

As the above operations, the image buffer unit 141 buffers the pixels in the horizontal lines received from the image capturing element 12 in the line buffers 1412a to 1412d, respectively. Along with this, the image buffer unit 141 outputs pixels that are the same in the value in the X direction, i.e., pixels (X,Y−4), (X,Y−3), (X,Y−2), (X,Y−1), and (X,Y) from the output parts 1413a to 1413e respectively, at the same timing.

FIG. 6 represents the configuration example of the image buffer unit 141, and it is not limited thereto. Therefore, the image buffer unit 141 may be any unit if it has only to perform the same action as the buffering processing of the image buffer unit 141. Configuration and Operation of Filter Processing Unit 143

Figure 8:
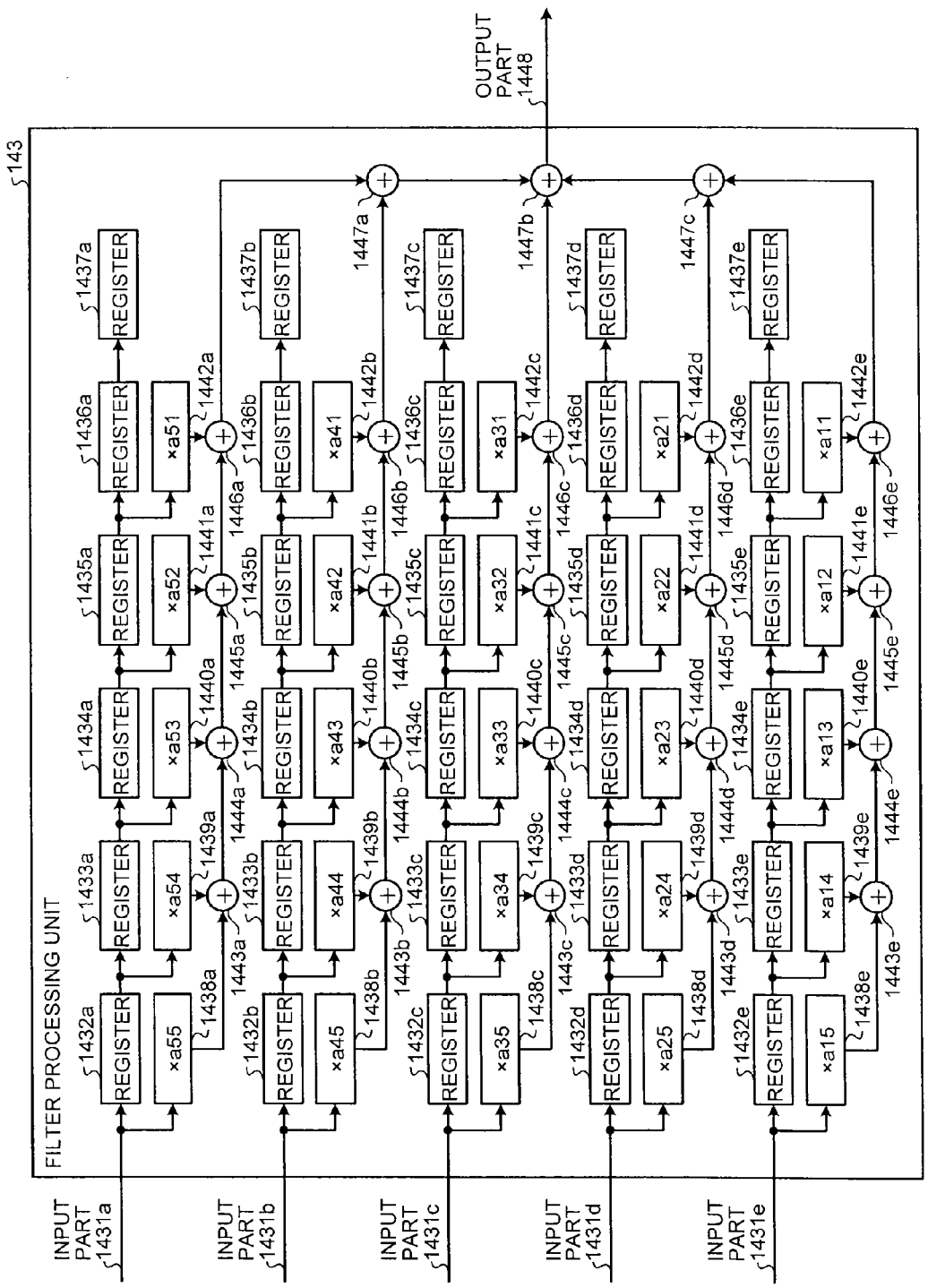
FIG. 8 is a diagram of a configuration example of a filter processing unit in the image processing unit according to the embodiment.
Figure 11:
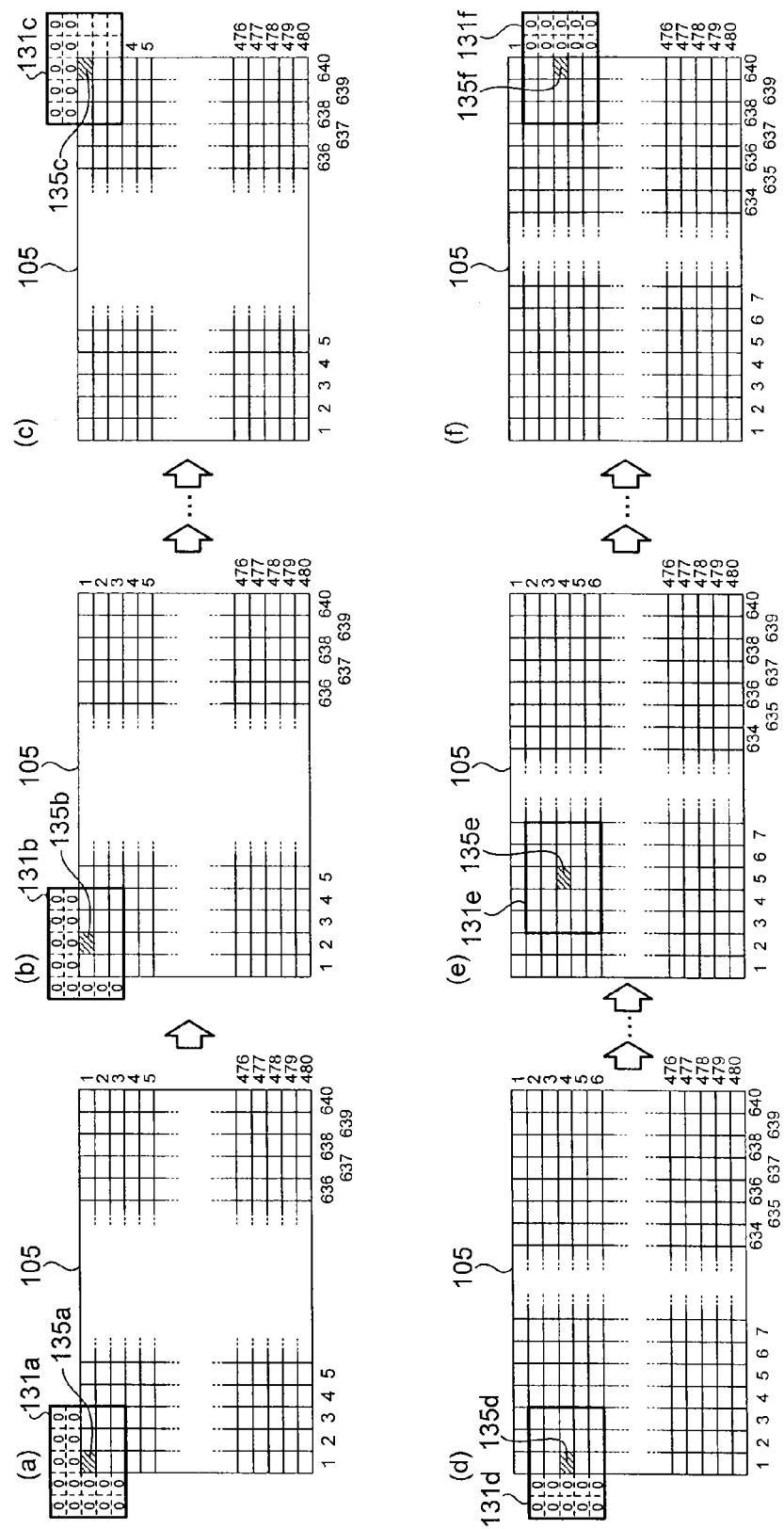
FIG. 11 is a diagram for explaining an operation of scanning a target partial image of the image targeted for the filter processing of the inverse transform filter.

FIG. 8 is a diagram of a configuration example of the filter processing unit in the image processing unit according to the embodiment. FIG. 9 is a diagram of a configuration example of the inverse transform filter. FIG. 10 is a diagram for explaining how the inverse transform filter performs filter processing on the image. FIG. 11 is a diagram for explaining an operation of scanning a target partial image of the image targeted for the filter processing of the inverse transform filter. A configuration and operation of the filter processing unit 143 of the image processing unit 14 are explained below with reference to FIG. 8 to FIG. 11.

The filter processing unit 143 includes, as illustrated in FIG. 8, registers 1432a to 1432e, 1433a to 1433e, 1434a to 1434e, 1435a to 1435e, 1436a to 1436e, and 1437a to 1437e. The filter processing unit 143 includes multipliers 1438a to 1438e, 1439a to 1439e, 1440a to 1440e, 1441a to 1441e, and 1442a to 1442e. The filter processing unit 143 includes adders 1443a to 1443e, 1444a to 1444e, 1445a to 1445e, 1446a to 1446e, and 1447a to 1447c. The filter processing unit 143 receives pixels output from the image buffer unit 141 through input parts 1431a to 1431e. Then the filter processing unit 143 performs a convolution operation on the received pixels using the inverse transform filter having a filter coefficient for which the deriving method will be explained later, and outputs an operation value from an output part 1448.

The multipliers 1438a to 1438e, 1439a to 1439e, 1440a to 1440e, 1441a to 1441e, and 1442a to 1442e are circuits each of which outputs a multiplication value of a value of the pixel received from its input side and a filter coefficient. Specifically, the multipliers 1438a to 1442a output multiplication values of filter coefficients a55 to a51 and the pixels, respectively. The multipliers 1438b to 1442b output multiplication values of filter coefficients a45 to a41 and the pixels, respectively. The multipliers 1438c to 1442c output multiplication values of filter coefficients a35 to a31 and the pixels, respectively. The multipliers 1438d to 1442d output multiplication values of filter coefficients a25 to a21 and the pixels, respectively. The multipliers 1438e to 1442e output multiplication values of filter coefficients a15 to a11 and the pixels, respectively. The adders 1443a to 1443e, 1444a to 1444e, 1445a to 1445e, 1446a to 1446e, and 1447a and 1447c are circuits each of which outputs an addition value of values of two data received from the input sides. The adder 1447b is a circuit that outputs an addition value of values of three data received from the input sides.

As illustrated in FIG. 8, the input parts 1431a to 1431e are connected to the input sides of the registers 1432a to 1432e, respectively. The registers 1432a to 1437a are connected in series. The same goes for the registers 1432b to 1437b, 1432c to 1437c, 1432d to 1437d, and 1432e to 1437e.

The input parts 1431a to 1431e are connected to the input sides of the multipliers 1438a to 1438e, respectively. The output sides of the registers 1432a to 1435a are connected to the input sides of the multipliers 1439a to 1442a, respectively. The same goes for a connection relation between the registers 1432b to 1435b and the respective multipliers 1439b to 1442b, a connection relation between the registers 1432c to 1435c and the respective multipliers 1439c to 1442c, a connection relation between the registers 1432d to 1435d and the respective multipliers 1439d to 1442d, and a connection relation between the registers 1432e to 1435e and the respective multipliers 1439e to 1442e.

The output sides of the multipliers 1438a to 1438e are connected to the input sides of the adders 1443a to 1443e, respectively. The adders 1443a to 1446a are connected in series. The same goes for the adders 1443b to 1446b, 1443c to 1446c, 1443d to 1446d, and 1443e to 1446e.

The output sides of the multipliers 1439a to 1442a are connected to the input sides of the adders 1443a to 1446a, respectively. The same goes for a connection relation between the multipliers 1439b to 1442b and the respective adders 1443b to 1446b, a connection relation between the multipliers 1439c to 1442c and the respective adders 1443c to 1446c, a connection relation between the multipliers 1439d to 1442d and the respective adders 1443d to 1446d, and a connection relation between the multipliers 1439e to 1442e and the respective adders 1443e to 1446e.

The output sides of the adders 1446a to 1446b are connected to the input sides of the adder 1447a. The output sides of the adders 1446d to 1446e are connected to the input sides of the adder 1447c. The output sides of the adders 1446c, 1447a, and 1447c are connected to the input sides of the adder 1447b. The output side of the adder 1447b is connected to the output part 1448.

The inverse transform processing in the filter processing unit 143 will be explained next with reference to FIG. 8 to FIG. 11. The filter used for inverse transform processing is, as illustrated in FIG. 9, an inverse transform filter 121 being a linear filter with 5×5 taps formed by the filter coefficients a11 to a15, a21 to a25, a31 to a35, a41 to a45, and a51 to a55. Part of an image targeted for the inverse transform processing using the inverse transform filter 121 is a target partial image 131 illustrated in FIG. 10. The target partial image 131 is a 5×5 partial image formed by pixels A11 to A15, A21 to A25, A31 to A35, A41 to A45, and A51 to A55.

It is assumed that no data is stored, i.e., a value of 0 is stored in the registers 1432a to 1432e, 1433a to 1433e, 1434a to 1434e, 1435a to 1435e, 1436a to 1436e, and 1437a to 1437e. The filter processing unit 143 receives the pixels A51, A41, A31, A21, and A11 of the target partial image 131 from the input parts 1431a to 1431e, stores the pixels in the registers 1432a to 1432e, and inputs the pixels into the multipliers 1438a to 1438e, respectively. The multipliers 1438a to 1438e output multiplication values of the filter coefficients a55, a45, a35, a25, and a15 and the received pixels A51, A41, A31, A21, and A11, respectively. The multiplication values calculated by the multipliers 1438a to 1438e are added by the adders 1447a to 1447c, respectively. The addition value is output from the adder 1447b, and the output value is output from the output part 1448 to the outside of the filter processing unit 143.

The filter processing unit 143 shifts the pixels A51, A41, A31, A21, and A11 stored in the registers 1432a to 1432e to the registers 1433a to 1433e at the next timing and stores the pixels therein, and inputs the pixels to the multipliers 1439a to 1439e, respectively. The filter processing unit 143 receives the pixels A52, A42, A32, A22, and A12 of the target partial image 131 from the input parts 1431a to 1431e, stores the pixels in the registers 1432a to 1432e, and inputs the pixels into the multipliers 1438a to 1438e, respectively. The multipliers 1439a to 1439e output multiplication values of the filter coefficients a54, a44, a34, a24, and a14 and the received pixels A51, A41, A31, A21, and A11, respectively. The multipliers 1438a to 1438e output multiplication values of the filter coefficients a55, a45, a35, a25, and a15 and the received pixels A52, A42, A32, A22, and A12, respectively. The multiplication values calculated by the multipliers 1439a to 1439e and the multiplication values calculated by the multipliers 1438a to 1438e are added to each other by the adders 1443a to 1443e and 1447a to 1447c. The addition value is output from the adder 1447b, and the output value is output from the output part 1448 to the outside of the filter processing unit 143.

As a result of repeating the above operations, the pixels A55 to A51, A45 to A41, A35 to A31, A25 to A21, and A15 to A11 are assumed to be stored in the registers 1432a to 1436a, 1432b to 1436b, 1432c to 1436c, 1432d to 1436d, and 1432e to 1436e, respectively. In addition, the pixels A55 to A51, A45 to A41, A35 to A31, A25 to A21, and A15 to A11 are assumed to be input to the multipliers 1438a to 1442a, 1438b to 1442b, 1438c to 1442c, 1438d to 1442d, and 1438e to 1442e, respectively. The multipliers 1442a to 1442e output multiplication values of the filter coefficients a51, a41, a31, a21, and a11 and the received pixels A51, A41, A31, A21, and A11, respectively. The multipliers 1441a to 1441e output multiplication values of the filter coefficients a52, a42, a32, a22, and a12 and the received pixels A52, A42, A32, A22, and A12, respectively. The multipliers 1440a to 1440e output multiplication values of the filter coefficients a53, a43, a33, a23, and a13 and the received pixels A53, A43, A33, A23, and A13, respectively. The multipliers 1439a to 1439e output multiplication values of the filter coefficients a54, a44, a34, a24, and a14 and the received pixels A54, A44, A34, A24, and A14, respectively. The multipliers 1438a to 1438e output multiplication values of the filter coefficients a55, a45, a35, a25, and a15 and the received pixels A55, A45, A35, A25, and A15, respectively.

The multiplication values calculated by the multipliers 1438a to 1438e, 1439a to 1439e, 1440a to 1440e, 1441a to 1441e, and 1442a to 1442e are added by all the adders illustrated in FIG. 8. The addition value is output from the adder 1447b, and output from the output part 1448 to the outside of the filter processing unit 143. The addition value is, as illustrated in FIG. 10, the same as a value, obtained by that the inverse transform filter 121 performs the convolution operation on the target partial image 131, i.e., an operation value represented by Equation (1). The operation value of the convolution operation is a value obtained by executing the inverse transform processing to center data being a pixel located at the center of the target partial image 131. That is, the operation value of the convolution operation is a pixel, in an image after the inverse transform processing, at a position corresponding to the data at the center of the image before the inverse transform processing.

For the inverse transform processing of the filter processing unit 143, an overview of the operation of performing inverse transform processing while scanning a horizontal line in the X direction in an image 105 will be explained next with reference to FIG. 11. FIG. 11(a) represents a state in which the filter processing unit 143 performs the inverse transform processing for the pixel (1, 1) in the image 105 using the inverse transform filter 121. As illustrated in FIG. 11(a), to perform the convolution operation with the pixel (1, 1) as center data 135a, pixels at a portion where the image 105 overlaps a target partial image 131a with the pixel (1, 1) as the center data are required. In other words, pixels, of the target partial image 131a, corresponding to the pixels A33 to A35, A43 to A45, and A53 to A55 of the target partial image 131 illustrated in FIG. 10 are required.

To perform the operation, the pixels corresponding to the pixels A33 to A35, A43 to A45, and A53 to A55 need to be output from the output parts 1413a to 1413c of the image buffer unit 141. Moreover, the pixels corresponding to the pixels A35 to A33, A45 to A43, and A55 to A53 need to be stored in the registers 1432c to 1434c, 1432b to 1434b, and 1432a to 1434a of the filter processing unit 143, respectively. In the target partial image 131a, pixels at portions that do not overlap the image 105 are treated as "0".

In the state as explained above, the filter processing unit 143 performs the convolution operation on the target partial image 131a using the inverse transform filter 121 similarly to the convolution operation illustrated in FIG. 10. The filter processing unit 143 outputs a value obtained by performing the convolution operation for the pixel (1, 1) being the center data 135a of the target partial image 131a in the image 105, as the pixel (1, 1) of the image after the inverse transform processing.

Then, as illustrated in FIG. 11(b), the filter processing unit 143 shifts a pixel as a target for convolution operation by one in the X direction and performs the inverse transform processing for the pixel (2, 1) being center data 135b of a target partial image 131b. The filter processing unit 143 repeats the convolution operation while shifting the horizontal line in the X direction and performs, as illustrated in FIG. 11(c), the inverse transform processing for a pixel (640, 1) being the last pixel of the horizontal line in the X direction. The pixel (640, 1) is center data 135c of a target partial image 131c as illustrated in FIG. 11(c).

As explained above, the filter processing unit 143 repeats the convolution operation while shifting the horizontal line in the X direction, and performs, when the inverse transform processing performed for the last pixel in the horizontal line is ended, the inverse transform processing for the next horizontal line in the Y direction in the same manner as above.

FIG. 11(d) to FIG. 11(f) represent states in which the filter processing unit 143 performs the inverse transform processing for pixels in a fourth horizontal line in the Y direction of the image 105. FIG. 11(d) represents a state in which the filter processing unit 143 performs the inverse transform processing for a pixel (1, 4) in the image 105 using the inverse transform filter 121. As illustrated in FIG. 11(d), to perform the convolution operation with the pixel (1, 4) as center data 135d, pixels as a portion where the image 105 overlaps a target partial image 131d with the pixel (1, 4) as center data are required. In the target partial image 131d, pixels as portions that do not overlap the image 105 are treated as "0" in the same manner as above.

FIG. 11(e) represents a state in which the filter processing unit 143 performs the inverse transform processing for a pixel (5, 4) in the image 105 using the inverse transform filter 121. As illustrated in FIG. 11(e), because the whole of a target partial image 131e with the pixel (5, 4) as center data 135e overlaps the image 105, the filter processing unit 143 can perform the inverse transform processing using all the pixels included in the target partial image 131e.

The filter processing unit 143 repeats the convolution operation while shifting in the X direction on the horizontal line and performs, as illustrated in FIG. 11(f), the inverse transform processing for a pixel (640, 4) being the last pixel of the horizontal line in the X direction. The pixel (640, 4) is center data 135f of a target partial image 131f as illustrated in FIG. 11(f).

As explained above, the filter processing unit 143 performs the inverse transform processing by performing the convolution operation for the pixels that form the image 105 using the inverse transform filter 121, and can therefore correct the image blurred by the phase plate 11a, thus making it possible to improve resolution of the image.

For the target partial image targeted for the convolution operation in the image 105 using the inverse transform filter 121, as explained above, the pixels as portions not overlapping the image 105 are set as "0"; however, it is not limited thereto. For example, pixels obtained when the pixels as a portion overlapping the image 105 of the target partial image are folded over with the center data of the target partial image as a reference may be used as the pixels as a portion not overlapping the image 105 of the target partial image.

The target partial image 131a in FIG. 11(a) is used as an example for specific explanation. Names of pixels in the target partial image 131a are supposed to be the same as these of the pixels in the target partial image 131 illustrated in FIG. 10. In this case, the pixels in the portion that does not overlap the image 105 of the target partial image 131a are the pixels A11 to A15, A21 to A25, A31, A32, A41, A42, A51, and A52. The pixels in the portion that overlaps the image 105 of the target partial image 131a are the pixels A33 to A35, A43 to A45, and A53 to A55.

For the pixels A31, A32, A41, A42, A51, and A52, at this time, the values of the pixels A35, A34, A45, A44, and A55, and A54 are used respectively as a result of folding the pixels in the portion overlapping the image 105 of the target partial image 131a with the center data as the reference. For the pixels A13 to A15 and A23 to A25, the values of the pixels A53 to A55 and A43 to A45 are used, respectively, as a result of folding the pixels in the portion overlapping the image 105 of the target partial image 131a with the center data as the reference. For the pixels A11, A12, A21, and A22, the pixels having a positional relation being a point symmetry among the pixels in the portion overlapping the image 105 of the target partial image 131a with the center data as the reference, that is, the values of A55, A54, A45, and A44 are used, respectively. The pixels in the target partial image may be determined by using the above-mentioned method.

As illustrated in FIG. 9 and FIG. 10, the inverse transform filter provided in the filter processing unit 143 is the filter with 5×5 taps; however, it is not limited thereto. That is, the number of taps of the filter may be any different number such as 3×3, 15×15, or 21×21. In this case, the size of the target partial image is also required to be matched according to the number of taps of the filter. The number of taps of the filter needs to be an odd number so that the center data targeted for the inverse transform processing using the filter is present.

In addition, the inverse transform filter preferably has, for example, 15×15 or more of taps. For the inverse transform filter, a larger number of taps can increase the width of an optical axis where it is possible to correct blur of the image to which the blur is added by the phase plate to extend the depth of field. Therefore, by using the inverse transform filter with a large number of taps, design variations for the phase plate and the lens relating to the depth of field can be increased.

Derivation of Frequency Characteristic of Inverse Transform Filter

A method of deriving the frequency characteristic of the inverse transform filter used for inverse transform processing of restoring the spot spread by the lens unit 11 being the optical system in one focus position so as to be converged into one point will be explained first. As a filter for implementing the frequency characteristic, a two-dimensional linear filter and a finite impulse response (FIR) filter are preferable.

First of all, a model for an influence due to the optical system on the image captured by the image capturing element 12 is represented by Equation of two-dimensional convolution operation represented by the following Equation (2).

$$image_{captured}(x,y) = \iint image_{ideal}(x-x', y-y') \cdot h(x,y,x',y') \, dx' dy' \quad (2)$$

Where $image_{captured}$ is a pixel of a two-dimensional captured image detected through the optical system, $image_{ideal}$ is a pixel of an ideal image indicating the subject 4 itself, and h is PSF of the optical system.

It is considered below how to derive the frequency characteristic of the inverse transform filter that minimizes a mean square error with respect to an error between pixels of the image after the inverse transform processing and pixels of the ideal image in consideration of the influence of noise added to an image processing system (the image capturing element 12 and the image processing unit 14). The mean square error is represented by the following Equation (3).

$$E[|image_{ideal}(n) - image_{processed}(n)|^2] \quad (3)$$

Where E [ ] represents an expected value (mean value), n represents a position on the image, and $image_{processed}$ (n) represents a pixel of the image for which the inverse transform processing is performed on the $image_{captured}$. It is considered that the $image_{captured}$ includes noise.

The Equation (3) is represented by the following Equation (4) as the mean square error in a frequency area based on Parseval's theorem that the sum of whole energy of waveform×(n) over the whole area of n is equal to the sum of the all frequency components of Fourier transform X(ω) of energy of the waveform×(n).

$$E[|IMAGE_{ideal}(\omega) - IMAGE_{processed}(\omega)|^2] \quad (4)$$

Where $IMAGE_{ideal}$ (ω) represents frequency characteristic of $image_{ideal}$(n), $IMAGE_{processed}$ (ω)) represents frequency characteristic of $image_{processed}$ (n), and ω represents spatial frequency.

Let the frequency characteristic of the inverse transform filter be R(ω), frequency characteristic R(ω) that minimizes the following Equation (5) is an optimal inverse transform filter.

$$E[|IMAGE_{ideal}(\omega) - R(\omega) \cdot IMAGE_{captured}(\omega)|^2] \quad (5)$$

Where $IMAGE_{captured}$ (ω) is frequency characteristic of $image_{captured}$(n)

In the Equation (5), let $IMAGE_{ideal}$ (ω)=S(ω) and $IMAGE_{captured}$(ω)=X(ω), and by differentiating the Equation (5) by R* in order to calculate the minimum value of the Equation (5), the following Equation (6) is obtained.

$$\frac{\partial E[|S(\omega) - R(\omega) \cdot X(\omega)|^2]}{\partial R^*} = \qquad (6)$$

$$\frac{\partial E[(S(\omega) - R(\omega)X(\omega))(S(\omega) - R(\omega)X(\omega))^*]}{\partial R^*} =$$

$$\frac{\partial E\begin{bmatrix} S(\omega)S(\omega)^* - S(\omega)(R(\omega)X(\omega))^* - \\ R(\omega)X(\omega)S(\omega)^* - R(\omega)X(\omega)(R(\omega)X(\omega))^* \end{bmatrix}}{\partial R^*} =$$

$$\frac{\partial E\begin{bmatrix} |S(\omega)|^2 - S(\omega)R(\omega)^* X(\omega)^* - \\ R(\omega)X(\omega)S(\omega)^* + R(\omega)|X(\omega)|^2 R(\omega)^* \end{bmatrix}}{\partial R^*} =$$

$$\frac{\partial \left\{ \begin{array}{l} E[|S(\omega)|^2] - R(\omega)^* E[S(\omega)X(\omega)^*] - \\ R(\omega)E[X(\omega)S(\omega)^*] + R(\omega)R(\omega)^*|X(\omega)|^2 \end{array} \right\}}{\partial R^*} =$$

$$R(\omega) \cdot E[|X(\omega)|^2] - E[S(\omega) \cdot X(\omega)^*]$$

Where $E[|X(\omega)|^2]$ is a power spectrum of the captured image including noise, and $E[S(\omega) \cdot X(\omega)^*]$ is a mutual power spectrum of the captured image including noise and the ideal image.

Let the most right-hand side of the Equation (6) be 0 in order to calculate the minimum value of the Equation (5), the following Equation (7) is obtained.

$$R(\omega) \cdot E[|X(\omega)|^2] - E[S(\omega) \cdot X(\omega)] = 0 \tag{7}$$

The following Equation (8) is obtained from the Equation (7).

$$R(\omega) = \frac{E[S(\omega) \cdot X(\omega)^*]}{E[|X(\omega)|^2]} \tag{8}$$

The inverse transform filter based on the frequency characteristic $R(\omega)$ represented by the Equation (8) is an optimal filter that minimizes the mean square error represented by the Equation (3).

Here, let the frequency characteristic of noise be $W(\omega)$ and the frequency characteristic of h being PSF of the optical system be $H(\omega)$, and if the Equation (2) is represented in the frequency space, it is represented by the following Equation (9).

$$X(\omega) = H(\omega)S(\omega) + W(\omega) \tag{9}$$

Assuming that the frequency characteristic of noise $W(\omega)$ and the frequency characteristic $S(\omega)$ are uncorrelated, because $E[S(\omega) \cdot W(\omega)^*] = 0$, if the Equation (9) is substituted into the denominator on the right-hand side of the Equation (8), the following Equation (10) is obtained.

$$\begin{aligned}
E[S(\omega) \cdot X(\omega)^*] &= E[S(\omega)(H(\omega)S(\omega) + W(\omega))^*] \\
&= E[S(\omega)((H(\omega)S(\omega))^* + W(\omega)^*)] \\
&= E[S(\omega)(S(\omega)^* H(\omega)^* + W(\omega)^*)] \\
&= E[|S(\omega)|^2 H(\omega)^*] + E[S(\omega)W(\omega)^*] \\
&= E[|S(\omega)|^2 H(\omega)^*] \\
&= H(\omega)^* \cdot E[|S(\omega)|^2]
\end{aligned} \tag{10}$$

Likewise, assuming that the frequency characteristic of noise $W(\omega)$ and the frequency characteristic $S(\omega)$ are uncorrelated, because $E[W(\omega) \cdot S(\omega)^*] = 0$ and $E[S(\omega)^* \cdot W(\omega)] = 0$, if the Equation (9) is substituted into the denominator on the right-hand side of the Equation (8), the following Equation (11) is obtained.

$$\begin{aligned}
E[|X(\omega)|^2] &= E[(H(\omega)S(\omega) + W(\omega))(H(\omega)S(\omega) + W(\omega))^*] \\
&= E[H(\omega)S(\omega)H(\omega)^*S(\omega)^* + H(\omega)S(\omega)W(\omega)^* + \\
&\quad W(\omega)H(\omega)^*S(\omega)^* + W(\omega)W(\omega)^*] \\
&= E[|H(\omega)S(\omega)|^2] + E[|W(\omega)|^2] \\
&= E[|H(\omega)|^2|S(\omega)|^2] + E[|W(\omega)|^2] \\
&= |H(\omega)|^2 \cdot E[|S(\omega)|^2] + E[|W(\omega)|^2]
\end{aligned} \tag{11}$$

The frequency characteristic $R(\omega)$ represented by the following Equation (12) is obtained from the Equations (8), (10), and (11).

$$R(\omega) = \frac{H(\omega)^* \cdot E[|S(\omega)|^2]}{|H(\omega)|^2 \cdot E[|S(\omega)|^2] + E[|W(\omega)|^2]} \tag{12}$$

The inverse transform filter based on the frequency characteristic $R(\omega)$ represented by the Equation (12) is an optimal filter that minimizes the mean square error represented by the Equation (3) when considering the noise of the image processing system. Where, $E[|S(\omega)|^2]$ is a mean value of power spectrum of the ideal image, $E[|W(\omega)|^2]$ is a mean value of power spectrum of the noise, and $|H(\omega)|^2$ is a power spectrum of the frequency characteristic of the optical system.

When the frequency characteristic $R(\omega)$ represented by the Equation (12) is applied, by integrating with respect to square error of the pixels of the image after the inverse transform processing and the pixels of the ideal image in the frequency area, the following Equation (13) is obtained.

$$\begin{aligned}
&\int |S(\omega) - R(\omega) \cdot X(\omega)|^2 d\omega = \\
&\int |S(\omega) - R(\omega) \cdot \{H(\omega)S(\omega) + W(\omega)\}|^2 d\omega = \\
&\int |(1 - R(\omega)H(\omega))S(\omega) - R(\omega)W(\omega)|^2 d\omega = \\
&\int \{(1 - R(\omega)H(\omega))S(\omega) - R(\omega)W(\omega)\} \\
&\quad \{(1 - R(\omega)H(\omega))S(\omega) - R(\omega)W(\omega)\}^* d\omega = \\
&\int \{|(1 - R(\omega)H(\omega))S(\omega)|^2 - S(\omega)R(\omega)^*W(\omega)^* \\
&\quad (1 - R(\omega)H(\omega)) - R(\omega)W(\omega)S(\omega)^* \\
&\quad (1 - R(\omega)H(\omega))^* + |R(\omega)W(\omega)|^2\} d\omega = \\
&\int \{|1 - R(\omega)H(\omega)|^2 |S(\omega)|^2 + |R(\omega)|^2 |W(\omega)|^2\} d\omega
\end{aligned} \tag{13}$$

In the calculation of the Equation (13), as explained above, a first term on the most right-hand side of the Equation (13) using the fact that the frequency characteristic of noise $W(\omega)$ and the frequency characteristic $S(\omega)$ are uncorrelated represents an amount of errors of the image that cannot be restored after the inverse transform processing. A second term thereof represents an error amount due to the noise.

By designing frequency characteristic $H(\omega)$ of the optical system to minimize the integration value of the Equation (13), it is possible to obtain a combination of the optical system and the inverse transform filter that minimizes the mean square error in the frequency area illustrated in the Equation (5). A combination of the optical system and the inverse transform filter represented by the Equation (3) that minimizes the mean square error in the real space represented can be obtained based on Parseval's theorem.

However, the inverse transform filter based on the frequency characteristic $R(\omega)$ represented by the Equation (12) can restore the spots spread by the optical system in one focus position (i.e. frequency characteristic H at one location). Therefore, the inverse transform filter based on the frequency characteristic $R(\omega)$ represented by the Equation (12) is not an optimal filter for restoring spots in other defocus positions where the shapes of the spots are different.

Next, a method of deriving the frequency characteristic of the inverse transform filter used for the inverse transform processing for restoring spots spread by the lens unit 11 being the optical system within a range of defocus positions on the optical axis will be explained. With this operation, it is possible to calculate not the inverse transform filter optimal in one focus position but an inverse transform filter optimal in a plurality of positions.

First of all, two defocus positions are assumed, and, by deforming the Equation (5), the sum of mean square errors regarding two images in the frequency area is represented by the following Equation (14).

$$E[|\text{IMAGE1}_{ideal}(\omega) - R(\omega) \cdot \text{IMAGE1}_{captured}(\omega)|^2] + E[|\text{IMAGE2}_{ideal}(\omega) - R(\omega) \cdot \text{IMAGE2}_{captured}(\omega)|^2] \quad (14)$$

The two images correspond to IMAGE 1 AND IMAGE 2.

In the Equation (14), let $\text{IMAGE1}_{ideal}(\omega) = S1(\omega)$, $\text{IMAGE1}_{captured}(\omega) = X1(\omega)$, $\text{IMAGE2}_{ideal}(\omega) = S2(\omega)$, and $\text{IMAGE2}_{captured}(\omega) = X^2(\omega)$. By differentiating the Equation (14) by $R^*$ in order to calculate the minimum value of the Equation (14), then the following Equation (15) is obtained.

$$\frac{\partial E\left[\left|\begin{array}{c}\text{IMAGE1}_{ideal}(\omega) - \\ R(\omega) \cdot \\ \text{IMAGE1}_{captured}(\omega)\end{array}\right|^2\right] + E\left[\left|\begin{array}{c}\text{IMAGE2}_{ideal}(\omega) - \\ R(\omega) \cdot \\ \text{IMAGE2}_{captured}(\omega)\end{array}\right|^2\right]}{\partial R^*} = \quad (15)$$

$$R(\omega) \cdot E[|X1(\omega)|^2] - E(S1(\omega) \cdot X1(\omega)^*] + R(\omega) \cdot E[|X2(\omega)|^2] - E[S2(\omega) \cdot X2(\omega)^*] = R(\omega)\{E[|X1(\omega)|^2] + E[|X2(\omega)|^2]\} - \{E[S1(\omega) \cdot X1(\omega)^*] + E[S2(\omega) \cdot X2(\omega)^*]\}$$

Let the most right-hand side of the Equation (15) be 0 in order to calculate the minimum value of the Equation (15), and if the frequency characteristic $R(\omega)$ is solved, then the following Equation (16) is obtained.

$$R(\omega) = \frac{E[S1(\omega) \cdot X1(\omega)^*] + E[S2(\omega) \cdot X2(\omega)^*]}{E[|X1(\omega)|^2] + E[|X2(\omega)|^2]} \quad (16)$$

Assuming that the same image is captured by the image capturing apparatus 1, $S1(\omega)$ is equal to $S2(\omega)$ ($S1(\omega) = S2(\omega)$), and when these are defined as $S(\omega)$, then the following Equation (17) is obtained from a relational expression of the Equation (9).

$$R(\omega) = \frac{\{H1(\omega)^* + H2(\omega)^*\} \cdot E[|S(\omega)|^2]}{\{|H1(\omega)|^2 + |H2(\omega)|^2\}E[|S(\omega)|^2] + 2E[|W(\omega)|^2]} \quad (17)$$

The inverse transform filter based on the frequency characteristic $R(\omega)$ represented by the Equation (17) is an optimal filter that minimizes the mean square error in the frequency area represented by the Equation (14).

Although the above explanation indicates the case of the two images, generalized frequency characteristic $R(\omega)$ in N images, i.e., in N defocus positions is represented by the following Equation (18)

$$R(\omega) = \frac{\sum_{n=1}^{N} \{Hn(\omega)^*\} \cdot E[|S(\omega)|^2]}{\sum_{n=1}^{N} \{|Hn(\omega)|^2\}E[|S(\omega)|^2] + N \cdot E[|W(\omega)|^2]} \quad (18)$$

The inverse transform filter based on the frequency characteristic $R(\omega)$ represented by the Equation (18) is an optimal filter that minimizes the mean square error corresponding to a plurality of defocus positions in the frequency area based on the Equation (14) in consideration of the noise in the image processing system. The frequency characteristic R is preferably derived with defocus positions as many as possible, i.e., with N value as large as possible.

When the frequency characteristic $R(\omega)$ represented by the Equation (17) is applied, by integrating the square errors between the pixels of the images after the inverse transform processing and the pixels of the ideal image in the frequency area, the following Equation (19) is obtained.

$$\int |S(\omega) - R(\omega) \cdot X1(\omega)|^2 + |S(\omega) - R(\omega) \cdot X2(\omega)|^2 d\omega = \quad (19)$$

$$\int [|S(\omega) - R(\omega) \cdot \{H1(\omega)S(\omega) + W(\omega)\}|^2 + |S(\omega) - R(\omega) \cdot \{H2(\omega)S(\omega) + W(\omega)\}|^2]d\omega =$$

$$\int \{|1 - R(\omega)H1(\omega)|^2|S(\omega)|^2 + |1 - R(\omega)H2(\omega)|^2|S(\omega)|^2 + 2|R(\omega)|^2|W(\omega)|^2\}d\omega$$

In the calculation of the Equation (19), as explained above, it is used that the frequency characteristic of noise $W(\omega)$ and the frequency characteristic $S(\omega)$ are uncorrelated.

For the Equation (19), when generalization is performed on the N images, i.e., on the N defocus positions, the following Equation (20) is obtained.

$$\int \sum_{n}^{N} |S(\omega) - R(\omega) \cdot Xn(\omega)|^2 d\omega = \quad (20)$$

$$\int \left[\sum_{n}^{N} \{|1 - R(\omega)Hn(\omega)|^2|S(\omega)|^2\} + N|R(\omega)|^2|W(\omega)|^2\right]d\omega$$

A value represented by the following Equation (21) being a value obtained by dividing the value represented by the Equation (20) by N is defined as mean square error (MSE) in the frequency area when the value is generalized in the N defocus positions.

$$MSE = \frac{1}{N} \int \left[\sum_{n}^{N} \{|1 - R(\omega)Hn(\omega)|^2|S(\omega)|^2\} + N|R(\omega)|^2|W(\omega)|^2\right]d\omega \quad (21)$$

By designing the frequency characteristic $H(\omega)$ of the optical system to minimize the MSE represented by the Equation (21), it is possible to obtain a combination of the optical system and the inverse transform filter that minimizes the MSE in the frequency area represented by the Equation (14). It is also possible to obtain a combination of the optical system and the inverse transform filter that minimizes the MSE in real space, based on Parseval's theorem. Therefore, for example, the inverse transform filter 121 provided in the image buffer unit 141 of the image processing unit 14 can be derived based on the frequency characteristic $R(\omega)$ represented in the Equation (18).

As explained above, for N defocus positions, i.e., a plurality of defocus positions, an optimal inverse transform filter can be obtained from the frequency characteristic $R(\omega)$ represented in the Equation (18). This enables the restoration by the same inverse transform filter even if the shapes of the spots vary depending on the defocus positions, thus extending the depth of field up to a wider range.

Figure 12:
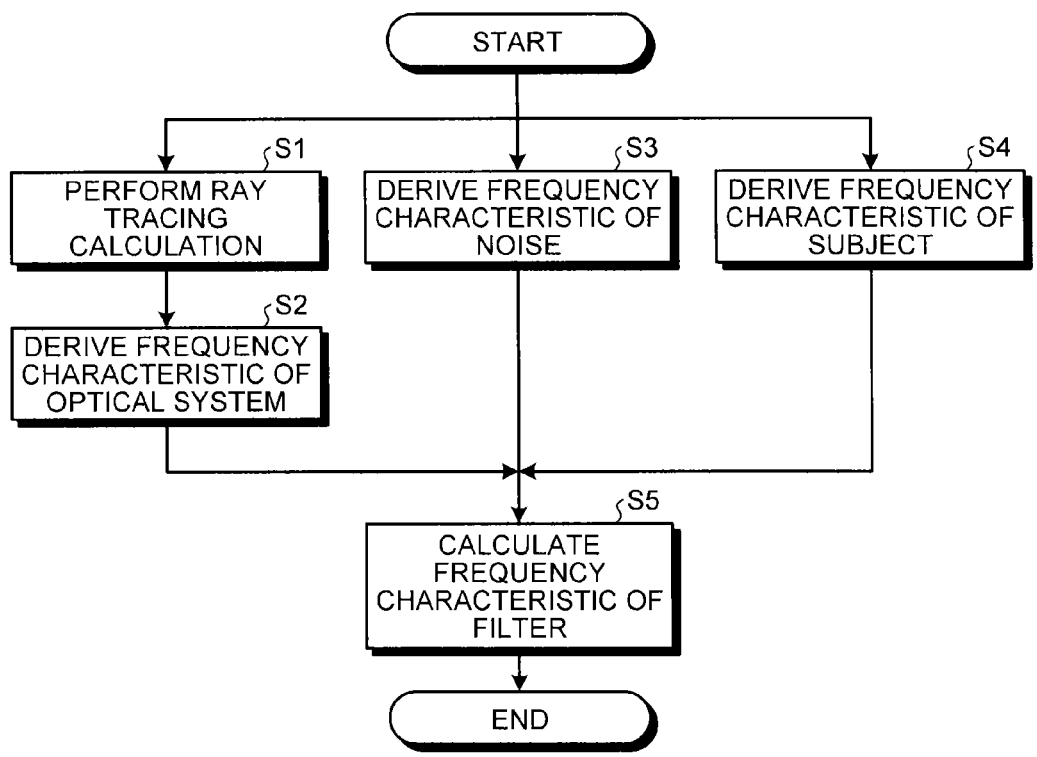
FIG. 12 is a flowchart of how to calculate frequency characteristic in order to determine the inverse transform filter of the filter processing unit in the image processing unit according to the embodiment.

FIG. 12 is a flowchart of how to calculate frequency characteristic in order to determine the inverse transform filter of the filter processing unit in the image processing unit according to the embodiment. The flow of specifically calculating the frequency characteristic R represented by the Equation (18) will be explained with reference to FIG. 12.

Step S1

First of all, PSF is derived by performing ray tracing calculation on the lens unit 11 based on optical system parameters such as a surface curvature and surface separation in the lens unit 11, and characteristics of the phase plate 11a. Here, the ray tracing calculation is performed by using the optical system parameters in the defocus positions to derive the PSF. The process then proceeds to Step S2.

Step S2

The PSF derived at Step S1 is subjected to Fourier transform to derive the frequency characteristic H of the optical system. The process then proceeds to Step S5.

Step S3

Characteristic of noise added to the image processing system (the image capturing element 12 and the image processing unit 14) is measured. Then, Fourier transform is performed on the noise characteristic to derive frequency characteristic W of the noise. If it is difficult to measure the noise characteristic, then the frequency characteristic W of the noise may be derived based on a value of a signal-to-noise (S/N) ratio of the image capturing element 12 as a constant independent of the spatial frequency. The process then proceeds to Step S5.

Step S4

An image of a natural scene or of a barcode captured by the image capturing apparatus 1 in various sizes and under various image capturing conditions is determined as an ideal image. Values of pixels forming the ideal image are subjected to Fourier transform, and a mean value for spatial frequencies $\omega$ is derived as frequency characteristic S of the subject. The frequency characteristic S of the subject may be frequency characteristic of pixels of the captured image based on the light having passed through the optical system that provides no aberration to the light output from the subject. The frequency characteristic S of the subject may be a constant. The process then proceeds to Step S5.

Step S5

Frequency characteristic R of the inverse transform filter is calculated by using the Equation (18) from the frequency characteristic H of the optical system derived at Step S2, the frequency characteristic W of the noise derived at Step S3, and the frequency characteristic S of the subject derived at Step S4.

Spatial-Frequency Characteristic of MTF

Figure 13:
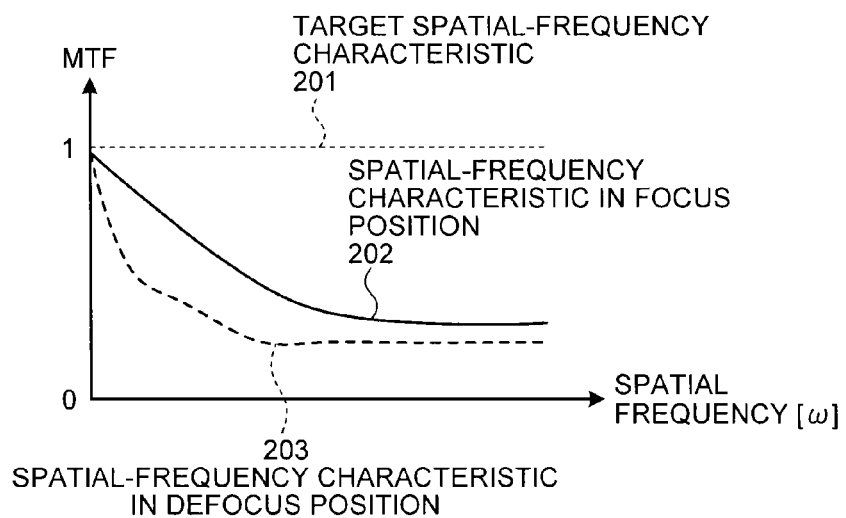
FIG. 13 is a diagram illustrating spatial-frequency characteristic of the image detected by light passing through an optical system.
Figure 14A:
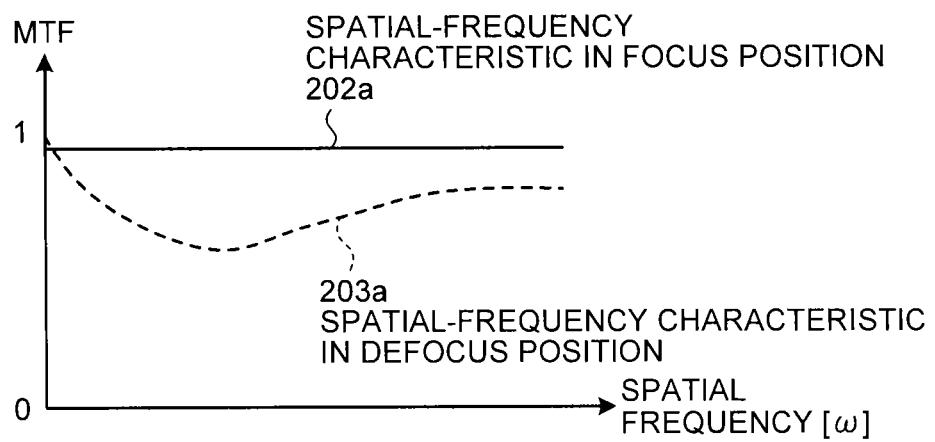
FIG. 14A and FIG. 14B are diagrams each illustrating spatial-frequency characteristic of the image subjected to the inverse transform processing.
Figure 14B:
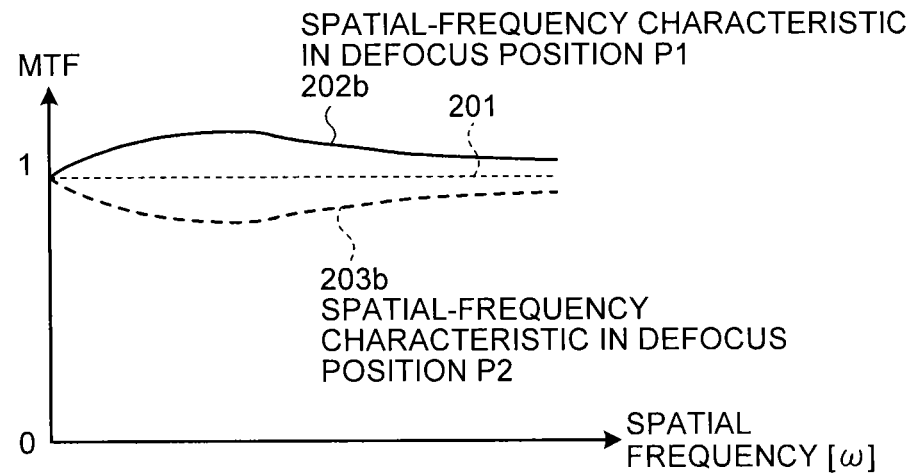

FIG. 13 is a diagram illustrating spatial-frequency characteristic of the image detected by light passing through the optical system. FIG. 14A and FIG. 14B are diagrams each illustrating the spatial-frequency characteristic of the image having been subjected to the inverse transform processing. The spatial-frequency characteristic of the image will be explained with reference to FIG. 13 and FIGS. 14A and 14B.

The MTF with respect to the spatial frequency $\omega$ of the image obtained by capturing the light passing through the lens unit 11 (optical system) using the image capturing element 12 will be explained with reference to FIG. 13. A target spatial-frequency characteristic 201 illustrated in FIG. 13 represents characteristic (MTF=1) of the MTF with respect to the spatial frequency $\omega$ when contrast of the captured image of the subject is fully reproduced.

As explained above, the light passing through the lens unit 11 is added with the PSF by the action of the lens and the phase plate 11a providing aberration. A spatial frequency characteristic 202 in FIG. 13 represents a characteristic of the MTF of the captured image captured by the image capturing element 12 in a focus position with respect to the spatial frequency $\omega$. A spatial frequency characteristic 203 in FIG. 13 represents a characteristic of the MTF of the captured image captured by the image capturing element 12 in a defocus position based on the light passing through the lens unit 11, with respect to the spatial frequency $\omega$. Because the light passing through the lens unit 11 is added with the PSF, both of the spatial frequency characteristic 202 in the focus position and the spatial frequency characteristic 203 in the defocus position become values lower than that of the target spatial-frequency characteristic 201 as illustrated in FIG. 13.

A case is considered, with reference to FIG. 14A, in which the inverse transform filter provided in the filter processing unit 143 illustrated in FIG. 8 is calculated based on the frequency characteristic R represented by the Equation (12). In this case, the MTF of the image captured by the image capturing element 12 and subjected to the inverse transform processing by the filter processing unit 143, with respect to the spatial frequency $\omega$ is explained below.

A spatial frequency characteristic 202a in FIG. 14A represents a characteristic of the MTF of the captured image captured by the image capturing element 12 in a focus position and subjected to the inverse transform processing by the filter processing unit 143, with respect to the spatial frequency $\omega$. A spatial frequency characteristic 203a in FIG. 14A represents a characteristic of the MTF of the captured image captured by the image capturing element 12 in a defocus position and subjected to the inverse transform processing by the filter processing unit 143, with respect to the spatial frequency $\omega$. As explained above, the Equation (12) is the frequency characteristic R of the inverse transform filter that restores the image added with the PSF by the lens unit 11 in one focus position, and therefore MTF=1 as illustrated by the spatial frequency characteristic 202a, and the spatial frequency characteristic 202a coincides with the target spatial-frequency characteristic 201. However, the inverse transform filter derived from the frequency characteristic R represented by the Equation (12) does not correspond to the defocus position where the shape of the spot is different from that in the focus position. Therefore, the MTF of the spatial frequency characteristic 203a is lower than the MTF of the spatial frequency characteristic 202a.

A case is considered, with reference to FIG. 14B, in which the inverse transform filter provided in the filter processing unit 143 illustrated in FIG. 8 is calculated based on the frequency characteristic R represented by the Equation (18). In this case, the MTF of the image captured by the image capturing element 12 and subjected to the inverse transform processing by the filter processing unit 143, with respect to the spatial frequency $\omega$ is explained below.

A spatial frequency characteristic 202b in FIG. 14B represents a characteristic of the MTF of the captured image captured by the image capturing element 12 in a defocus position P1 and subjected to the inverse transform processing by the filter processing unit 143, with respect to the spatial frequency $\omega$. A spatial frequency characteristic 203b in FIG. 14B represents a characteristic of the MTF of the captured image captured by the image capturing element 12 in a defocus position P2 and subjected to the inverse transform processing by the filter processing unit 143, with respect to the spatial frequency ω. As explained above, the Equation (18) is the frequency characteristic R of the inverse transform filter that restores the image added with the PSF by the lens unit 11 in a plurality of defocus positions, i.e., in a predetermined position range (depth of field) on the optical axis. Therefore, the image is captured by the image capturing element 12 even in any one of the defocus positions included in the depth of field, and the MTF of the image subjected to the inverse transform processing by the filter processing unit 143, in the spatial-frequency characteristic is close to the MTF of the target spatial-frequency characteristic 201. In other words, the frequency characteristics of the images obtained by performing the inverse transform processing on the images in the defocus positions with the inverse transform filter are, as illustrated in FIG. 14B, values larger or smaller than those of the target spatial-frequency characteristic 201. In any case, the frequency characteristic of the image subjected to the inverse transform processing by the inverse transform filter is close to the target spatial-frequency characteristic 201 as illustrated in FIG. 14B.

As explained above, the filter processing unit 143 can restore the image added with the PSF by the lens unit 11 in a predetermined position range by the inverse transform processing using the inverse transform filter calculated based on the frequency characteristic R(ω) represented by the Equation (18). Therefore, even if the shape of the spot varies in the predetermined position range, restoration is possible by the same inverse transform filter, thus extending the depth of field up to a wider range.

According to the embodiment, the depth of field can be extended up to a wider range.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image capturing apparatus comprising:
an optical system that provides an aberration to incident light;
an image capturing unit that transforms the light passing through the optical system into pixels to capture an image; and
an inverse transform unit that performs inverse transform processing on the image captured by the image capturing unit, wherein
the inverse transform unit performs the inverse transform processing using an inverse transform filter that performs transform such that frequency characteristics of pixels in two or more of defocus positions, in an output image, within a predetermined range on an optical axis of the optical system, have a larger value in at least one defocus position with respect to frequency characteristic of pixels in an ideal image and have a smaller value in at least one other defocus position with respect to the frequency characteristic of the pixels in the ideal image.

2. The image capturing apparatus according to claim 1, wherein the inverse transform filter is a filter that minimizes a mean square error between pixels in the ideal image and pixels in the output image in the two or more of the defocus positions within the predetermined range.

3. The image capturing apparatus according to claim 1, wherein the inverse transform filter is a filter that minimizes a mean square error between the frequency characteristic of the pixel in the ideal image and the frequency characteristic of the pixel in the output image of the inverse transform unit.

4. The image capturing apparatus according to claim 1, wherein pixels of the image captured by the image capturing unit include noise.

5. The image capturing apparatus according to claim 1, wherein frequency characteristic R of the inverse transform filter is calculated by following Equation (1):

$$R(\omega) = \frac{\sum_{n=1}^{N} \{Hn(\omega)^*\} \cdot E[|S(\omega)|^2]}{\sum_{n=1}^{N} \{|Hn(\omega)|^2\} E[|S(\omega)|^2] + N \cdot E[|W(\omega)|^2]} \quad (1)$$

where
R: the frequency characteristic of the inverse transform filter,
S: the frequency characteristic of pixels in the ideal image,
W: frequency characteristic of noise,
Hn: frequency characteristic of point spread function of the optical system at n-th position in the predetermined range,
N(≥2): number of the defocus positions in the predetermined range, and
ω: spatial frequency.

6. The image capturing apparatus according to claim 5, wherein the frequency characteristic S of the pixels in the ideal image is frequency characteristic of pixels into which the image capturing unit transforms light passing through an optical system that provides no aberration to incident light output from a subject.

7. The image capturing apparatus according to claim 5, wherein the frequency characteristic S of the pixel in the ideal image is a constant.

8. The image capturing apparatus according to claim 1, wherein the optical system includes a phase plate that provides the aberration to light output from a subject.

9. The image capturing apparatus according to claim 1, wherein the optical system includes a lens that provides a spherical aberration as the aberration to light output from a subject.

10. The image capturing apparatus according to claim 1, wherein a number of taps of the inverse transform filter is an odd number.

11. The image capturing apparatus according to claim 1, wherein
the frequency characteristic of the pixels in the ideal image is frequency characteristic of pixels into which the image capturing unit transforms light passing through an optical system that provides no aberration to incident light output from a subject, and
the frequency characteristic S of the pixel in the ideal image is a constant.

12. The image capturing apparatus according to claim 1, wherein the inverse transform filter causes modulation transfer functions (MTFs) regarding the two or more of defocus positions within the predetermined range on the optical axis of the optical system to include at least one MTF with a larger value and at least one MTF with a smaller value with respect to an ideal MTF.

13. An image capturing system comprising:
an image capturing apparatus; and
an information processing device, wherein
the image capturing apparatus includes
an optical system that provides an aberration to incident light; and circuitry that
    transforms the light passing through the optical system into pixels to capture an image, and
    performs inverse transform processing on the image captured, wherein
the circuitry performs the inverse transform processing using an inverse transform filter that performs transform such that frequency characteristics of pixels in two or more of defocus positions, in an output image, within a predetermined range on an optical axis of the optical system, have a larger value in at least one defocus position with respect to frequency characteristic of pixels in an ideal image and have a smaller value in at least one other defocus position with respect to the frequency characteristic of the pixels in the ideal image, and
the information processing device includes circuitry that receives the image subjected to the inverse transform processing from the image capturing apparatus, and a display that displays the image.

14. An image capturing method comprising:
providing an aberration to incident light;
transforming the light provided with the aberration into pixels to capture an image; and
performing inverse transform processing on the image captured, the performing performs the inverse transform processing using an inverse transform filter that performs transform such that frequency characteristics of pixels in two or more of defocus positions, in an output image, within a predetermined range on an optical axis of the optical system, have a larger value in at least one defocus position with respect to frequency characteristic of pixels in an ideal image and have a smaller value in at least one other defocus position with respect to the frequency characteristic of the pixels in the ideal image.

* * * * *